US012750281B2

(12) United States Patent
Bega et al.

(10) Patent No.: US 12,750,281 B2
(45) Date of Patent: Sep. 29, 2026

(54) SYSTEMS AND METHODS TO ENABLE REPRESENTATIVE USER EQUIPMENT SAMPLING FOR USER EQUIPMENT-RELATED ANALYTICS SERVICES

(71) Applicant: NOKIA SOLUTIONS AND NETWORKS OY, Espoo (FI)

(72) Inventors: Dario Bega, Munich (DE); Christian Mannweiler, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/394,162

(22) Filed: Aug. 4, 2021

(65) Prior Publication Data

US 2022/0046410 A1 Feb. 10, 2022

Related U.S. Application Data

(60) Provisional application No. 63/062,056, filed on Aug. 6, 2020.

(51) Int. Cl.

| | |
|---|---|
| ***H04L 41/142*** | (2022.01) |
| ***H04L 41/0893*** | (2022.01) |
| ***H04W 8/18*** | (2009.01) |
| ***H04W 68/02*** | (2009.01) |

(52) U.S. Cl.

CPC ........ *H04L 41/142* (2013.01); *H04L 41/0893* (2013.01); *H04W 8/186* (2013.01); *H04W 68/02* (2013.01)

(58) Field of Classification Search

None

See application file for complete search history.

(56) References Cited

U.S. PATENT DOCUMENTS

| | | | | |
|---|---|---|---|---|
| 8,069,012 | B2 * | 11/2011 | Chan | G06Q 30/0203 702/181 |
| 11,405,931 | B2 * | 8/2022 | Gupta | H04W 24/04 |
| 2009/0083737 | A1 | 3/2009 | Ben-Yehuda et al. | |
| 2009/0232012 | A1 * | 9/2009 | Zseby | H04L 43/022 370/252 |
| 2018/0129663 | A1 * | 5/2018 | Ivanov | G06Q 30/0201 |
| 2018/0262924 | A1 * | 9/2018 | Dao | H04W 72/535 |
| 2019/0065989 | A1 * | 2/2019 | Kida | G06F 17/18 |
| 2019/0116488 | A1 * | 4/2019 | Kumar | H04W 4/24 |

(Continued)

FOREIGN PATENT DOCUMENTS

| | | |
|---|---|---|
| CN | 110024326 A | 7/2019 |
| CN | 110463231 A | 11/2019 |

(Continued)

OTHER PUBLICATIONS

Extended European Search Report issued in corresponding European Patent Application No. 21188668.4 dated Dec. 22, 2021.

(Continued)

*Primary Examiner* — Wutchung Chu
*Assistant Examiner* — Berhanu D Belete
(74) *Attorney, Agent, or Firm* — Nokia Solutions and Networks Oy

(57) ABSTRACT

Systems, methods, apparatuses, and computer program products that enable representative user equipment (UE) sampling for UE-related analytics services are provided.

19 Claims, 7 Drawing Sheets

(56) References Cited

U.S. PATENT DOCUMENTS

| | | | | |
|---|---|---|---|---|
| 2019/0191330 | A1* | 6/2019 | Dao | H04L 12/4633 |
| 2019/0356558 | A1* | 11/2019 | Han | H04L 41/14 |
| 2019/0380037 | A1* | 12/2019 | Lifshitz | G06N 20/00 |
| 2020/0112907 | A1* | 4/2020 | Dao | H04M 15/8016 |
| 2020/0322775 | A1* | 10/2020 | Lee | H04W 8/02 |
| 2020/0322821 | A1* | 10/2020 | Lee | H04L 65/1016 |
| 2020/0358670 | A1* | 11/2020 | Lee | H04L 41/14 |
| 2020/0358689 | A1* | 11/2020 | Lee | H04L 43/065 |
| 2021/0014141 | A1* | 1/2021 | Patil | H04W 76/25 |
| 2021/0083956 | A1* | 3/2021 | Fan | H04L 43/0876 |
| 2021/0105193 | A1* | 4/2021 | Chong | H04L 12/4625 |
| 2021/0168651 | A1* | 6/2021 | Marquezan | H04W 28/0942 |
| 2021/0176650 | A1* | 6/2021 | Wang | H04W 8/14 |
| 2021/0185695 | A1* | 6/2021 | Gupta | H04W 72/543 |
| 2021/0243271 | A1* | 8/2021 | Flynn, IV | G16Y 10/75 |
| 2021/0266765 | A1* | 8/2021 | Zhang | H04W 24/02 |
| 2021/0306231 | A1* | 9/2021 | Lee | H04L 41/14 |
| 2021/0377754 | A1* | 12/2021 | Marquezan | H04L 41/0853 |
| 2022/0039046 | A1* | 2/2022 | Ianev | H04W 60/00 |
| 2022/0070071 | A1* | 3/2022 | Poe | H04L 43/02 |
| 2022/0232369 | A1* | 7/2022 | Puente Pestaña | H04L 67/14 |
| 2023/0037802 | A1* | 2/2023 | Karampatsis | H04W 24/10 |
| 2023/0062930 | A1* | 3/2023 | Puente Pestaña | H04W 24/08 |

FOREIGN PATENT DOCUMENTS

| | | | |
|---|---|---|---|
| CN | 110830282 | A | 2/2020 |
| TW | 201828193 | A | 8/2018 |
| WO | 2018/070981 | A1 | 4/2018 |
| WO | 2019/210947 | A1 | 11/2019 |
| WO | 2020/000370 | A1 | 1/2020 |
| WO | 2020/002507 | A1 | 1/2020 |

OTHER PUBLICATIONS

China Mobile, "KI #8, New Sols, Providing UE Analytics to the NWDAF", 3GPP Draft, S2-2004153, 3rd Generation Partnership Project (3GPP), 3GPP TSG-WG SA2 Meeting #139E e-meeting, May 22, 2020, URL: https://ftp.3gpp.org/tsg_sa/WG2_Arch/TSGS2_139e_Electronic/Docs/S2-2004153.zip.

ZTE, "Clarification of Data Collection from PCF and BSF", 3GPP Draft, S2-2002736, 3rd Generation Partnership Project (3GPP), 3GPP TSG-SA2 Meeting #138-E, Apr. 10, 2020, URL: https://ftp.3gpp.org/tsg_sa/WG2_Arch/TSGS2_138e_Electronic/Docs/S2-2002736.zip.

Huawei et al., "Clarify usage of sampling ratio", 3GPP Draft, S2-2002165, 3rd Generation Partnership Project (3GPP), 3GPP TSG-WG SA2 Meeting #137 e-meeting, Feb. 18, 2020, URL: https://ftp.3gpp.org/tsg_saMG2_Arch/TSGS2_137e_Electronic/Docs/ S2-2002165.zip.

Parsons, V.L., "Stratified Sampling" abstract, Wiley StatsRef: Statistics Reference Online, Feb. 15, 2017, doi:10.1002/9781118445112.stat05999.pub2.

"3rd Generation Partnership Project; Technical Specification Group Services and System Aspects; Architecture enhancements for 5G System (5GS) to support network data analytics services (Release 16)", 3GPP TS 23.288, V16.3.0, Mar. 2020.

"3rd Generation Partnership Project; Technical Specification Group Services and System Aspects; System architecture for the 5G System (5GS); Stage 2 (Release 16)", 3GPP TS 23.501, V16.4.0, Mar. 2020.

"3rd Generation Partnership Project; Technical Specification Group Services and System Aspects; Procedures for the 5G System (5GS); Stage 2 (Release 16)", 3GPP TS 23.502, V16.4.0, Mar. 2020.

"3rd Generation Partnership Project; Technical Specification Group Services and System Aspects; Study on enablers for network automation for the 5G System (5GS); Phase 2 (Release 17)", 3GPP TS 23.700-91, V0.4.0, Jun. 2020.

Nokia et al., "KI #1 #2 #11, New Solution: Data Collection and Sharing Architecture", SA WG2 Meeting #139e, S2-2003669, Jun. 1, 2020.

First Office Action dated Aug. 26, 2023 corresponding to Chinese Patent Application No. 202110896566.7, with English summary thereof.

Chinese Office Action, with machine English language translation, corresponding to CN Application No. 202110896566.7, dated Jul. 16, 2024.

Second Office Action dated Feb. 18, 2024 corresponding to Chinese Patent Application No. 202110896566.7, with English summary thereof.

"Introducing partitioning criteria in event reporting information", SA WG2 Meeting #143e, S2-2101374, Nokia, Feb. 24-Mar. 9, 2021, 5 pages.

"NWDAF usage of partitioning criteria", SA WG2 Meeting #143e, S2-2100768, Nokia, Feb. 24-Mar. 9, 2021, 6 pages.

Notice of Allowance received for corresponding Chinese Patent Application No. 202110896566.7, dated Nov. 28, 2024, 4 pages of Notice of Allowance and no page of translation available.

"Abnormal analytics for any UE", 3GPP TSG-SA2 Meeting #138-E, S2-2002707, Orange, Apr. 20-23, 2020, 7 pages.

Notice of Allowance received for corresponding European Patent Application No. 21188668.4, dated Apr. 29, 2025, 7 pages.

Office action received for corresponding India Patent Application No. 202144035365, dated Oct. 29, 2025, 6 pages.

* cited by examiner

SYSTEMS AND METHODS TO ENABLE REPRESENTATIVE USER EQUIPMENT SAMPLING FOR USER EQUIPMENT-RELATED ANALYTICS SERVICES

CROSS-REFERENCE TO RELATED APPLICATIONS

This application claims priority from U.S. provisional patent application No. 63/062,056 filed on Aug. 6, 2020. The contents of this earlier filed application are hereby incorporated by reference in their entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for enabling representative user equipment (UE) sampling for UE-related analytics services.

BACKGROUND

Examples of mobile or wireless telecommunication systems may include the Universal Mobile Telecommunications System (UNITS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

BRIEF DESCRIPTION OF THE DRAWINGS

For proper understanding of example embodiments, reference should be made to the accompanying drawings, wherein.

DETAILED DESCRIPTION

Figure 1:
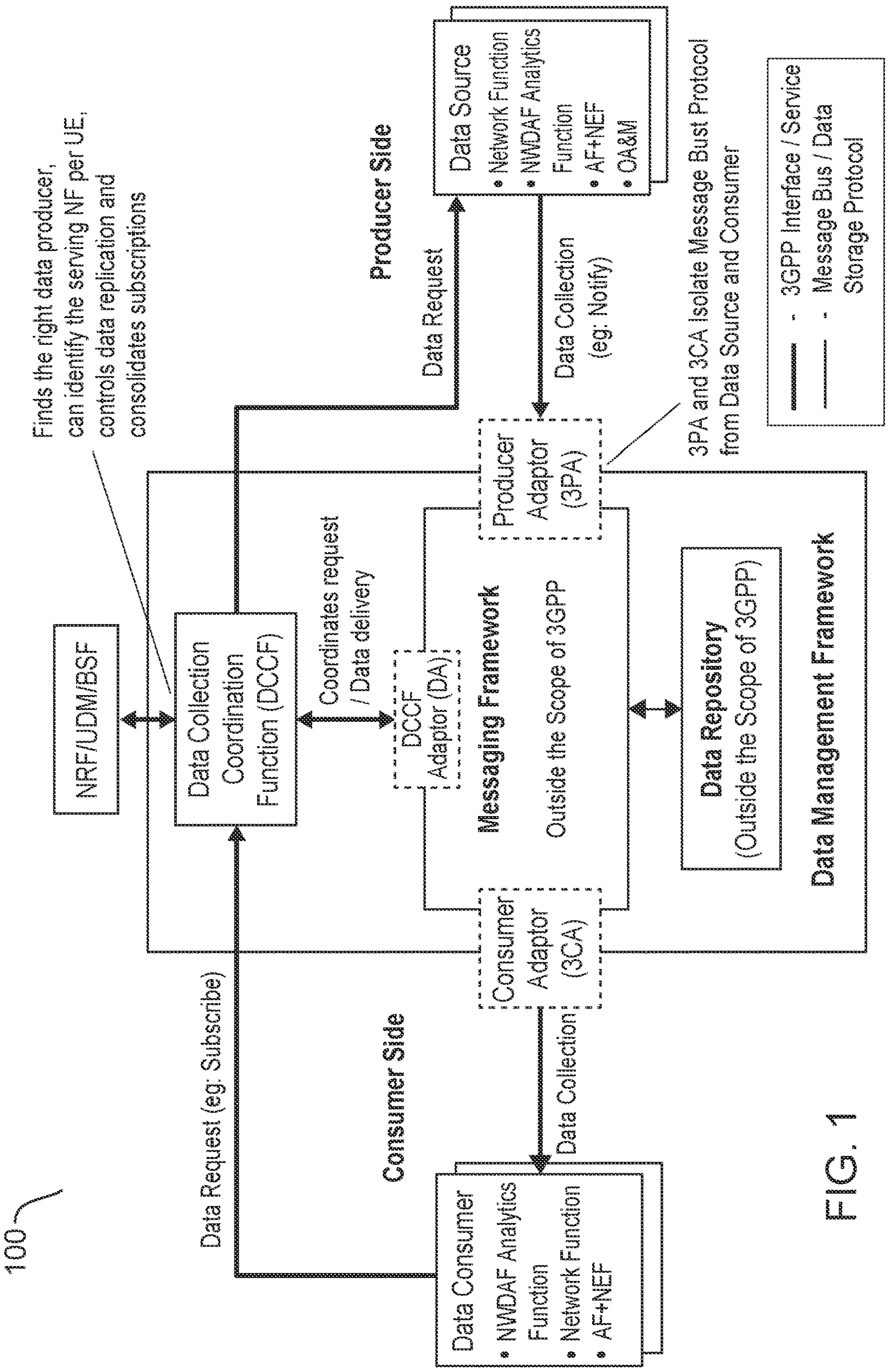
FIG. 1 illustrates an example architecture of a data collection framework, according to an embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products that enable representative user equipment (UE) sampling for UE-related analytics services, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain example embodiments may relate to the collection of one or more UEs' data, as performed by a network data analytics function (NWDAF) from Network Functions (NFs) (e.g., an access and mobility management function (AMF) for UE mobility analytics or a session management function (SMF) for abnormal behaviour related network analytics), in case of selection as target of analytics reporting. For example, a NWDAF service consumer can subscribe to NWDAF analytics information using a Nnwdaf_AnalyticsSubscription service. The consumer of the analytics may indicate, in the request, the target of analytics reporting, which can include specific UEs, a group of UEs or any UE (i.e., all UEs managed by a targeted NF).

When targeting a group of UEs or any UE, the NWDAF can specify, in event reporting information, a sampling ratio to reduce signalling and data collection load. When the NWDAF subscribes to event reporting from a NF and provides a sampling ratio, the targeted NF may select a random subset of UEs among all the UEs managed by the NF, according to the sampling ratio. The events related to this subset of UEs are reported to the NWDAF. A UE may remain selected until it is not managed by the event provider NF anymore. A UE newly managed by the event provider NF may also become selected.

The NWDAF may decide to reduce the amount of signalling and data collection load, by prioritizing requests received from analytics consumers, reducing the extent (e.g., duration or scope) of data collection, and/or modifying the sampling ratios.

As introduced above, a NWDAF service consumer (e.g., NFs or operations, administration and maintenance (OAM)) may specify, as a target of requested analytics, a specific UE, a group of UEs or any UE (i.e., all UEs). In this case, the NWDAF subscribes at the service producer (NF) to collect events related to a group of UE(s) or all UEs. To alleviate the potential heavy signalling and data collection load, a sampling ratio may be applicable as analytics filter. When a sampling ratio is provided, the targeted NF selects a random subset among the group of UEs targeted or all the UEs managed, according to the sampling ratio and just the events related to this subset are reported to the NWDAF.

Simple random sampling is a probability sampling technique for retrieving statistics from a subset of individuals chosen from the total population. According to this sampling technique, each individual is chosen entirely by chance and each member of the population has an equal chance of being included in the sample. Every possible sample of a given size has the same chance of selection. It is important that the selected group is representative of the population, and not biased in a systematic manner. However, there may be factors which divide up the population into sub-populations or strata, and it is expected that the data statistics vary among the different strata. This should be accounted for when selecting a sample from the population in order that a sample is obtained that is representative of the population. To do so, a stratified sample may be obtained by taking samples from each stratum or sub-group of a population. When a population with several strata is sampled, it may be preferable that the proportion of each stratum in the sample should be the same as in the population. Stratified sampling techniques are generally used when the population is heterogeneous or dissimilar, where certain homogeneous sub-populations can be isolated (strata). Simple random sampling is most appropriate when the entire population from which the sample is taken is homogeneous, i.e., when the population is not divided into multiple strata.

Therefore, simple random sampling does not guarantee that a particular subset selected is a perfect representation of the entire population. This, in the machine learning (ML) environment, could lead to problems related to misclassification and/or biased ML algorithms. For example, a misclassification or error in the inference leading to an incorrect conclusion about the UEs may occur (as an example the NWDAF could detect a false abnormal behavior, or wrong network performance analytics or observed service experience information). Also, training an ML model utilizing a non-representative subset can lead to biased ML algorithms which learn the wrong statistics and then provide biased analytics. As such, selecting a representative subset of UEs is not a trivial problem since NWDAF does not have a-priori knowledge about UEs statistics.

In the context of telecommunications networks (e.g., 3GPP networks), NWDAF currently does not have a-priori information about the distribution of the group of UEs or any UE (i.e. all UEs) targeted by the analytics. Hence, NWDAF may leverage simple random sampling techniques if the analytics consumer specifies in the analytics subscription a sampling ratio. i.e., NWDAF may be forced to work under the (typically incorrect) assumption that the population of UEs is free of any strata regarding the data to be collected. Therefore, other sampling techniques (such as stratified sampling) and methods to group UEs based on their characteristics are not available in the 3GPP specifications. As outlined above, this may lead to skewed or even incorrect statistics or analytic results due to lack of representativeness of the sampled UE group.

FIG. 1 illustrates an example functional architecture of a programmable data collection framework 100, according to an embodiment. The data collection framework 100 enables the collection and distribution of data (e.g., operational, trace, event, C-plane, M-plane, etc.) from sources to consumers. Data sources may be dynamically discovered by the framework based on the requests of data consumers. A messaging framework may be used to efficiently distribute data from data sources to data consumers, so that a data source does not need to replicate data towards its potential multiple data consumers. The data collection and coordination function (DCCF) may control the data sources and data consumers, but does not handle data. The DCCF is configured to expose available data to potential data consumers, to receive requests for data from data consumers, to trigger the production of data at data sources, and to dynamically configure the message framework to route and replicate data from data sources to data consumers.

The data collection framework 100 may include adaptors on the data source(s) and data consumer side. The 3rd Party Producer Adaptor (3PA) interfaces and the 3rd Party Consumer Adaptor (3CA) have the role to adapt the interfaces of the data sources and data consumers to the interface of the messaging framework.

In the data collection framework 100, a NWDAF may act as a data consumer and also as a data source. In the case in which NWDAF subscribe to a NF to collect data from a group of UEs, or any UE, as discussed above, the NWDAF would act as a data consumer. The components of the data collection framework (e.g., DCCF, Data Sources) that are responsible for collection and distribution of data from NFs to NWDAF, has no a-priori information about UEs' distribution nor does it have the capability to inform the data sources (i.e. NFs) about how to group UEs based on their characteristics.

An example embodiment provides systems and methods for avoiding a non-representative sampling of UE subsets when NWDAF requests to apply a sampling ratio. Certain embodiments are configured to avoid data collection from non-representative subset of the UEs. According to an example embodiment, an additional attribute, which may be called "partition criteria," may be included in the event reporting information. The attribute may be employed by the data providing NFs within a procedure for grouping of UEs and representative sampling within these subpopulations.

Therefore, according to certain embodiments, NWDAF may add the new attribute, which may be referred to herein as "partition criteria," to the event reporting information. When calling an event exposure/subscription service of the data provisioning NF, the NWDAF may provide the extended event reporting information including the partition criteria. In an embodiment, a data provisioning NF may use the extended event reporting information to group managed UEs into sub-populations or strata and may apply sampling in each of the sub-populations or strata according to the requested sampling ratio. Then, data of a representative random sample of UEs may be provided by the data provisioning NF to the NWDAF.

As introduced above, certain embodiments include the introduction of a partition criteria, as a new event reporting information parameter, and a procedure for UE grouping and sampling that may be employed by targeted NFs. In an embodiment, by leveraging the partition criteria, a NWDAF can inform the target NF to create strata, from among the UEs, grouping them based on a-priori service or network data information (such as application ID, type allocation code (TAC), UE communication and mobility information). In this way, it is possible to obtain a representative sample of the entire population.

Figure 2:
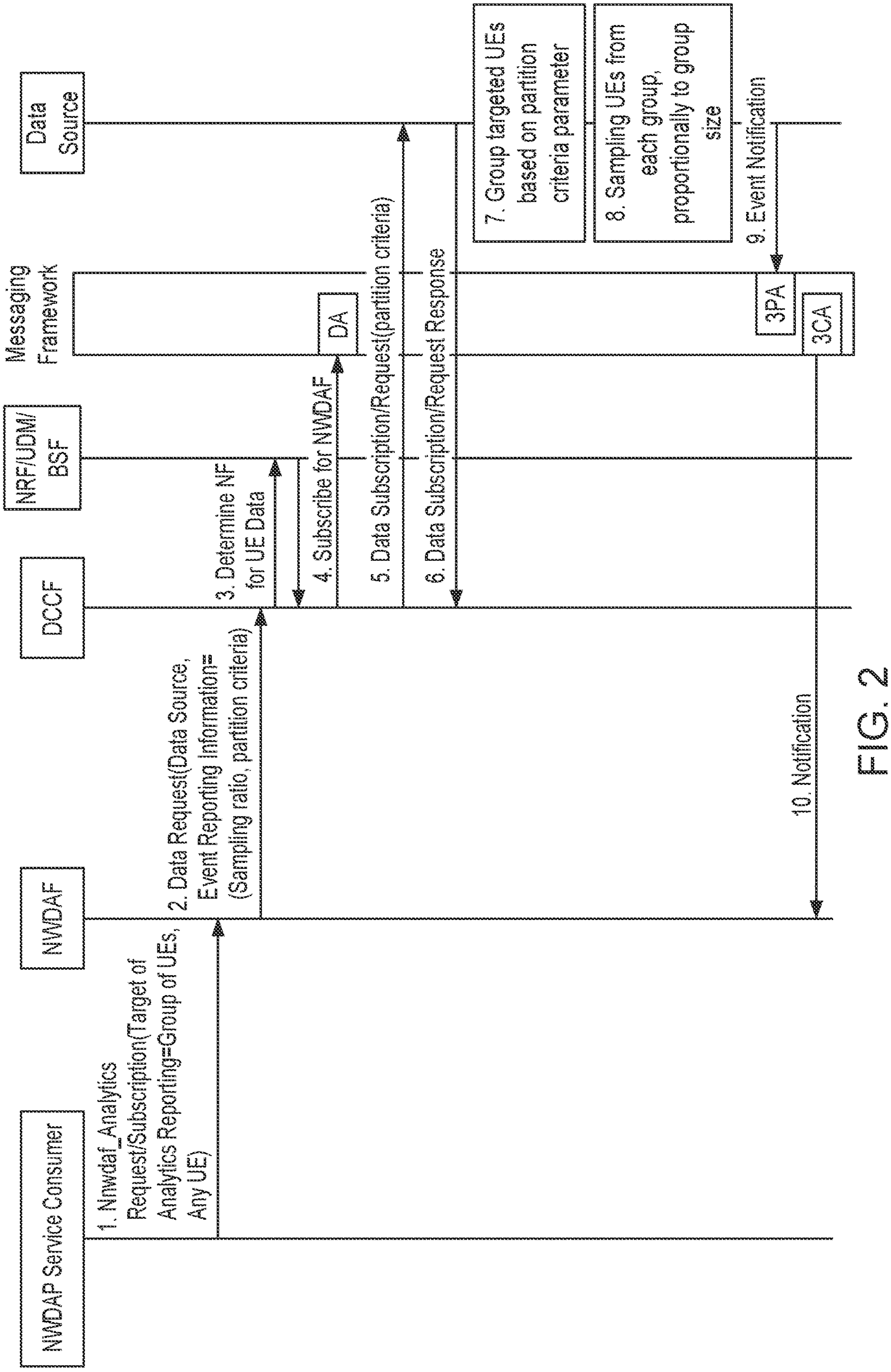
FIG. 2 illustrates an example signaling flow diagram, according to an embodiment.
Figure 3:
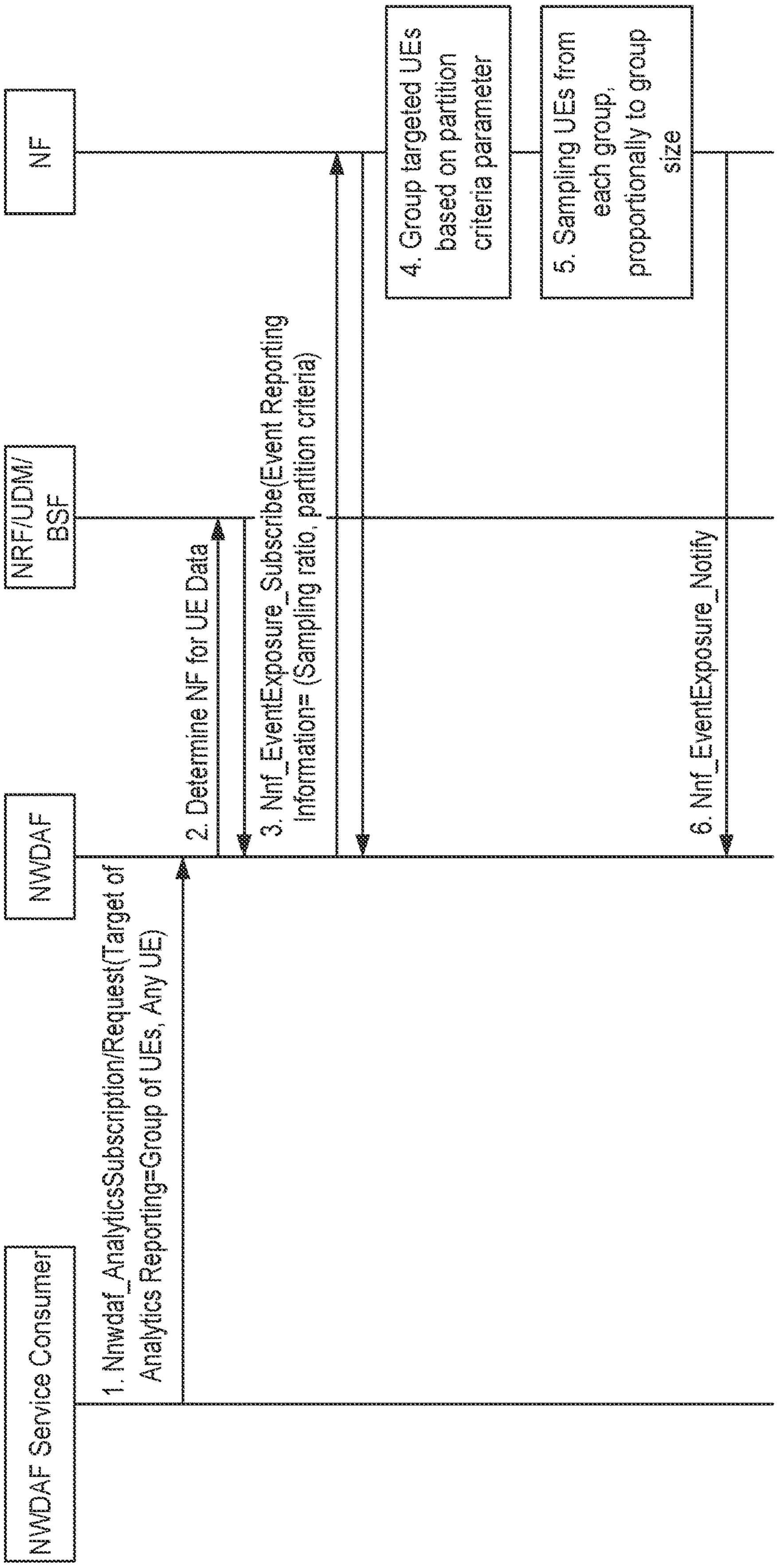
FIG. 3 illustrates an example signaling flow diagram, according to an embodiment.

FIGS. 2 and 3, as discussed in more detail below, illustrate two example signaling flow diagrams according to some embodiments. More specifically, FIG. 2 illustrates an example in the context of the data collection framework 100 depicted in FIG. 1, and FIG. 3 illustrates an example in the context of the 3GPP 5G core network (5GC) architecture.

As illustrated in the example of FIG. 2, at 1, a NWDAF service consumer may subscribe to and/or request for analytics information, e.g., by invoking the Nnwdaf_Analytics-Subscription_Subscribe/Nnwdaf_AnalyticsInfo_Request service operation. In an embodiment, the request from the NWDAF service consumer may include, among other things, input parameters such as the target of analytics reporting that indicates the objects for which analytics information is requested. The objects may include, for example, specific UEs, a group of UE(s) or any UE (i.e., all UEs).

According to an embodiment, as further illustrated in the example of FIG. 2, when a subscription/request to analytics information targeting a group of UE(s) or any UE is received, at 2, the NWDAF may send a request for data to the DCCF. To alleviate the signaling and data collection load, the NWDAF may set the value of a partition criteria to service or network information related to UE (such as Type Allocation Code (TAC), Application ID, UE communication) or to UE mobility information (collected from OAM) depending on the analytics required by the NWDAF Service Consumer, and may specify a sampling ratio. The partition criteria may be set to one or more indicators to group UEs (i.e., grouping based on multiple parameters is allowed).

In an embodiment, at 3, the DCCF may determine the NF(s) managing the UEs, e.g., by querying a network repository function (NRF)/unified data management (UDM)/binding support function (BSF). According to some embodiments, at 4, to subscribe for the NWDAF, the DCCF may control the message bus and the adapters so the notifications traverse the messaging framework. In one embodiment, 3CA may be provided with the NWDAF's notification endpoint. As also illustrated in the example of FIG. 2, at 5, the DCCF may send a data subscription/request to the data source (e.g. NFs as AMF or SMF) adding the partition criteria parameter to inform the data source how to group the UEs. At 6, the data source may acknowledge the request.

According to certain embodiments, at 7, the data source may group the targeted UEs (e.g., creates sub-populations/strata) based on the partition criteria. From each sub-population, at 8, the NF may select a subset of UEs by sampling randomly from each sub-population/stratum according to the sampling ratio. This means that each sub-population/stratum has the same sampling ratio regardless of the size of the sub-population/strata. Thus, the number of UEs selected from each sub-population/stratum is proportional to the size of the sub-population/stratum. In an embodiment, at 9, event notification(s) regarding the selected UEs may be sent to the messaging framework after an event trigger at the Data Source. Then, at 10, the messaging framework may send the event notification(s) to the NWDAF.

In the following, an example use case for UE mobility analytics is applied to the example of FIG. 2. According to this example, a NWDAF service consumer requires UE mobility analytics for a group of UEs that are the target of the analytics. The NWDAF requests data, from a DCCF, setting a partition criteria to be equal to TAC (as UEs with the same TAC may have similar mobility behaviour) and selecting a desirable sampling ratio. Upon receiving the request from the NWDAF, the DCCF may determine the NF(s) managing the UEs, and may control the message bus and the adapters so the notifications traverse the messaging framework. The DCCF may then send a data subscription/request to the data source, which in this example is an AMF, adding the "partition criteria=TAC" parameter to inform the AMF how to group the UEs. The AMF may acknowledge the request and may group the targeted UEs (i.e., creates sub-populations/strata) based on the partition criteria, so in this example based on TAC. The AMF may also select a subset of UEs sampling randomly from each stratum according to the sampling ratio. This means that each group/stratum has the same sampling fraction (equal to the sampling ratio regardless the group/stratum size), thus the number of UEs selected from each group is proportional to group size. Then, just notifications regarding the selected UEs are sent to the messaging framework after an event trigger at the AMF. The messaging framework may then send the notification to the NWDAF.

As introduced above, FIG. 3 illustrates an example signaling flow diagram in the context of the 3GPP 5G core network (5GC) architecture, according to one embodiment. As illustrated in the example of FIG. 3, at 1, a NWDAF service consumer may subscribe and/or request to/for analytics information, e.g., by invoking the Nnwdaf_Analytics-Subscription_Subscribe/Nnwdaf_AnalyticsInfo_Request service operation. In an embodiment, the request from the NWDAF service consumer may include, among other things, input parameters such as the target of analytics reporting that indicates the objects for which analytics information is requested. The objects may include, for example, specific UEs, a group of UE(s) or any UE (i.e., all UEs).

According to an embodiment, as further illustrated in the example of FIG. 3, when a subscription/request to analytics information targeting a group of UE(s) or any UE is received, at 2, the NWDAF may send a request to NRF/UDM/BSF to determine which NF(s) is/are managing the UEs and receive an indication of the NF(s). In one embodiment, at 3, the NWDAF may subscribe at the managing NF (e.g., NFs as AMF or SMF) by adding, e.g., to alleviate the signaling and data collection load, the partition criteria parameter combined with sampling ratio to the event reporting information in the event exposure service to inform the NF how to group the UEs. The NWDAF may set the value of the partition criteria to service or network information related to UEs (such as TAC, Application ID, UE communication) or to UE mobility information (collected from OAM) depending on the analytics required by the NWDAF service consumer, and may specify a sampling ratio. The partition criteria may be set to one or more indicators to group UEs (i.e., grouping based on multiple parameters is allowed).

As illustrated in the example of FIG. 3, at 4, the NF may group the targeted UEs (i.e., create sub-populations/strata) based on the partition criteria. From each sub-population, at 5, the NF may select a subset of UEs by sampling randomly from each sub-population according to the sampling ratio. This means that each sub-population/stratum may have the same sampling ratio regardless of the size of the sub-population/strata. Thus, the number of UEs selected from each sub-population/strata is proportional to the size of the sub-population/strata. Then, at 6, the NF may send the notification regarding the selected UEs to the NWDAF.

Because example embodiments provide a partition criteria parameter, as well as a grouping and sampling procedure, the subset of UEs selected is representative of all UEs. As a result, this avoids skewed (or even incorrect) statistics or analytic results due to lack or representativeness of the sampled UE group.

In the following, an example use case for UE mobility analytics is applied to the example of FIG. 3. According to this example, a NWDAF service consumer subscribes/requests to/for UE mobility analytics by invoking the Nnwdaf_AnalyticsSubscription_Subscribe/Nnwdaf_AnalyticsInfo_Request service operation, selecting as the target of analytics reporting a group of UE(s). For example, the NWDAF may send a request to NRF/UDM/BSF to determine which NF(s) is/are managing the UEs. After receiving an indication of the managing NF(s), the NWDAF may subscribe at the NF (AMF in this case) adding the partition criteria parameter as event reporting information in the event exposure service to inform the NF how to group the UEs. For example, the NWDAF may set the value of the partition criteria to TAC and specify a sampling ratio. The NF may then group the targeted UEs (i.e., create sub-populations/strata) based on the partition criteria, which in this example is based on TAC. Furthermore, the NF may select a subset of UEs sampling randomly from each sub-population/stratum according to the sampling ratio. This means that each group/stratum has the same sampling fraction (equal to the sampling ratio regardless of the group/stratum size). Then, the NF may send just the notification regarding the selected UEs to the NWDAF.

Figure 4:
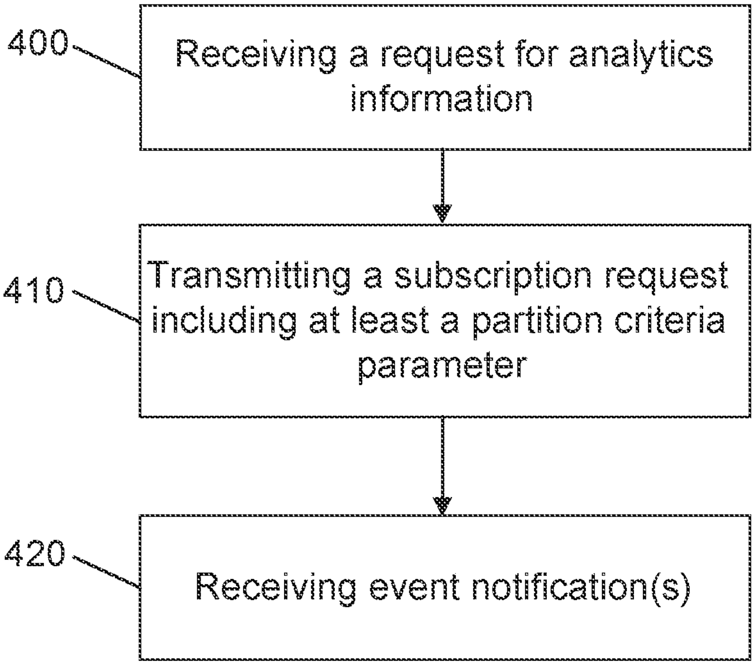
FIG. 4 illustrates an example flow diagram of a method, according to an embodiment.

FIG. 4 illustrates an example flow diagram of a method of sampling UE(s) and collecting UE data, according to one example embodiment. In certain example embodiments, the flow diagram of FIG. 4 may be performed by a network entity or network node in a communications system, such as LTE or 5G NR. In some example embodiments, the network entity performing the method of FIG. 4 may include a service consumer and/or NWDAF, or the like. For instance, in one example embodiment, the method of FIG. 4 may be performed by the NWDAF and/or NWDAF service consumer depicted in the example signaling flow diagrams of FIG. 2 or 3.

In an example embodiment, as illustrated in the example of FIG. 4, a method may include, at 400, receiving a request for analytics information that may include an indication of one or more objects or UEs for which the analytics information is requested. For example, the analytics information may be requested for a specific UE, group of UEs or all UEs. In an embodiment, the receiving 400 may include receiving the request may be received from a service consumer (e.g., NWDAF service consumer) invoking Nnwdaf_AnalyticsSubscription_Subscribe/Nnwdaf_AnalyticsInfo_Request service operation.

According to one example embodiment, the method may include determining the data source or NF(s) (e.g., AMF or SMF) managing the UE(s) for which the analytics information is requested. For instance, in this embodiment, the determining of the NF(s) may include sending a request to NRF/UDM/BSF to determine which NF(s) is/are managing the UE(s).

As illustrated in the example of FIG. 4, at 410, the method may include sending a subscription request, to a DCCF or the NF(s) managing the UE(s), where the subscription request may include event reporting information including a partition criteria parameter. In an embodiment, a value of the partition criteria parameter may be set to service or network information related to the UE(s) or to UE mobility information depending on the analytics information requested by the service consumer. In one example embodiment, the partition criteria parameter may include a Type Allocation Code (TAC), application identifier (ID), and/or UE communication. According to an embodiment, the subscription request may further specify a sampling ratio along with the partition criteria parameter. For example, in an embodiment, when specifying a sampling ratio, the partition criteria parameter may be set to ensure that a representative sample of objects/UEs are selected. In some embodiments, the partition criteria parameter may be set to one or more indicators to group UEs. According to one embodiment, the method may include, at 420, receiving a notification, from a messaging framework or the NF(s), for the indicated object(s) or UE(s). The notification may include the requested information.

Figure 5:
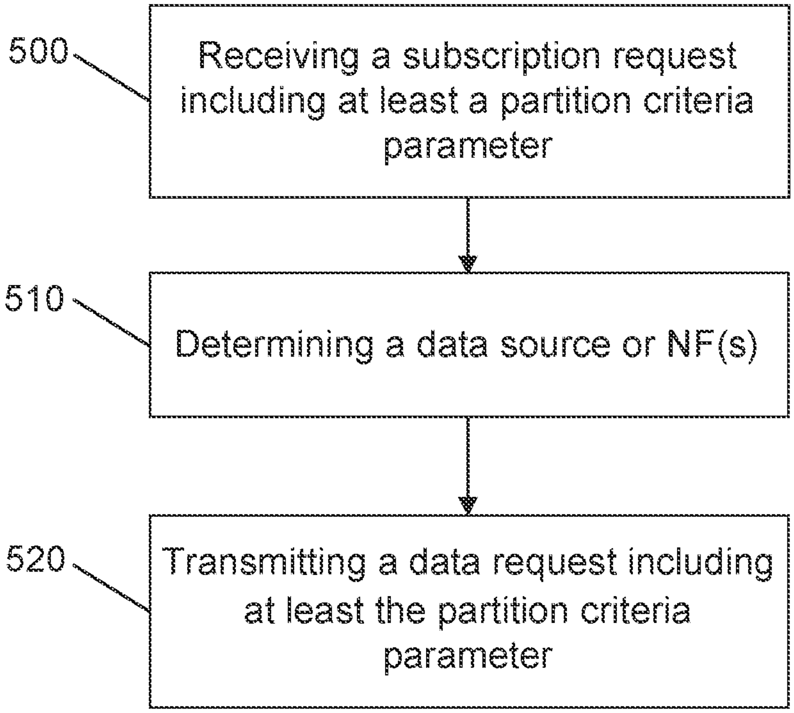
FIG. 5 illustrates an example flow diagram of a method, according to an embodiment.

FIG. 5 illustrates an example flow diagram of a method of sampling UE(s) and collecting UE data, according to one example embodiment. In certain example embodiments, the flow diagram of FIG. 5 may be performed by a network entity or network node in a communications system, such as LTE or 5G NR. In some example embodiments, the network entity performing the method of FIG. 5 may include data collection node, such as a DCCF, NRF, UDM, BSF, or the like. For instance, in one example embodiment, the method of FIG. 5 may be performed by the DCCF depicted in the example signaling flow diagram of FIG. 2 or the NRF/UDM/BSF depicted in the example of FIG. 3.

In an example embodiment, as illustrated in the example of FIG. 5, a method may include, at 500, receiving a subscription request, from a network node (e.g., NWDAF), that may include event reporting information including a partition criteria parameter. In an embodiment, a value of the partition criteria parameter may be set to service or network information related to one or more UE(s) or to UE mobility information depending on the analytics information requested by the service consumer. In one example embodiment, the partition criteria parameter may include a Type Allocation Code (TAC), application identifier (ID), and/or UE communication. According to an embodiment, the subscription request may further specify a sampling ratio along with the partition criteria parameter. In some embodiments, the partition criteria parameter may be set to one or more indicators to a group of UEs.

According to certain embodiments, the method of FIG. 5 may include, at 510, determining a data source or NF(s) managing the UE(s) associated with the received subscription request. In an embodiment where the method of FIG. 5 is performed by a DCCF, the method may include controlling the message bus and the adapters so the notifications traverse a messaging framework. In one embodiment, 3CA may be provided with the NWDAF's notification endpoint. As also illustrated in the example of FIG. 5, the method may include, at 520, sending a data request to the data source or NF(s) (e.g., AMF or SMF) including the partition criteria parameter to inform the data source or NF(s) how to group the UEs. In an embodiment, the method may include receiving an acknowledgement of the data request from the data source or NF(s).

Figure 6:
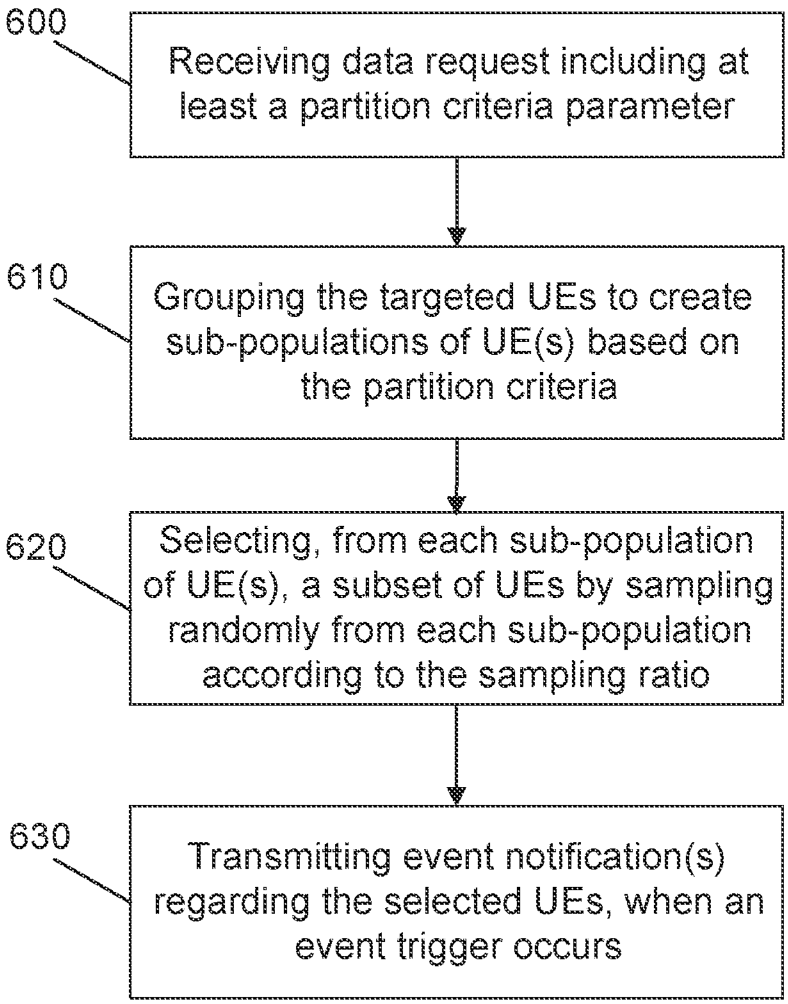
FIG. 6 illustrates an example flow diagram of a method, according to an embodiment.

FIG. 6 illustrates an example flow diagram of a method of sampling UE(s) and collecting UE data, according to one example embodiment. In certain example embodiments, the flow diagram of FIG. 6 may be performed by a network entity or network node in a communications system, such as LTE or 5GNR. In some example embodiments, the network entity performing the method of FIG. 6 may include network node, such as a data source, NF, AMF, SMF, or the like. For instance, in one example embodiment, the method of FIG. 6 may be performed by the data source depicted in the example signaling flow diagram of FIG. 2 or the NF depicted in the example of FIG. 3.

In an example embodiment, as illustrated in the example of FIG. 6, a method may include, at 600, receiving a data request including a partition criteria parameter indicating how to group UE(s) managed by the network node. According to certain embodiments, the receiving 600 may also include receiving a sampling ratio along with the partition criteria parameter. In an embodiment, the method may include providing an acknowledgement to the data request.

According to an embodiment, the method of FIG. 6 may include, at 610, grouping the targeted UEs to create sub-populations of UE(s) based on the partition criteria. At 620, the method may include selecting, from each sub-population of UE(s), a subset of UEs by sampling randomly from each sub-population according to the sampling ratio. As such, each sub-population has the same sampling ratio regardless of the size of the sub-population, and the number of UEs selected from each sub-population is proportional to the size of the sub-population. In an embodiment, the method may include, at 630, upon an event trigger, transmitting event notification(s) regarding the selected UEs to a messaging framework or NWDAF.

Figures 7A, 7B, 7C:
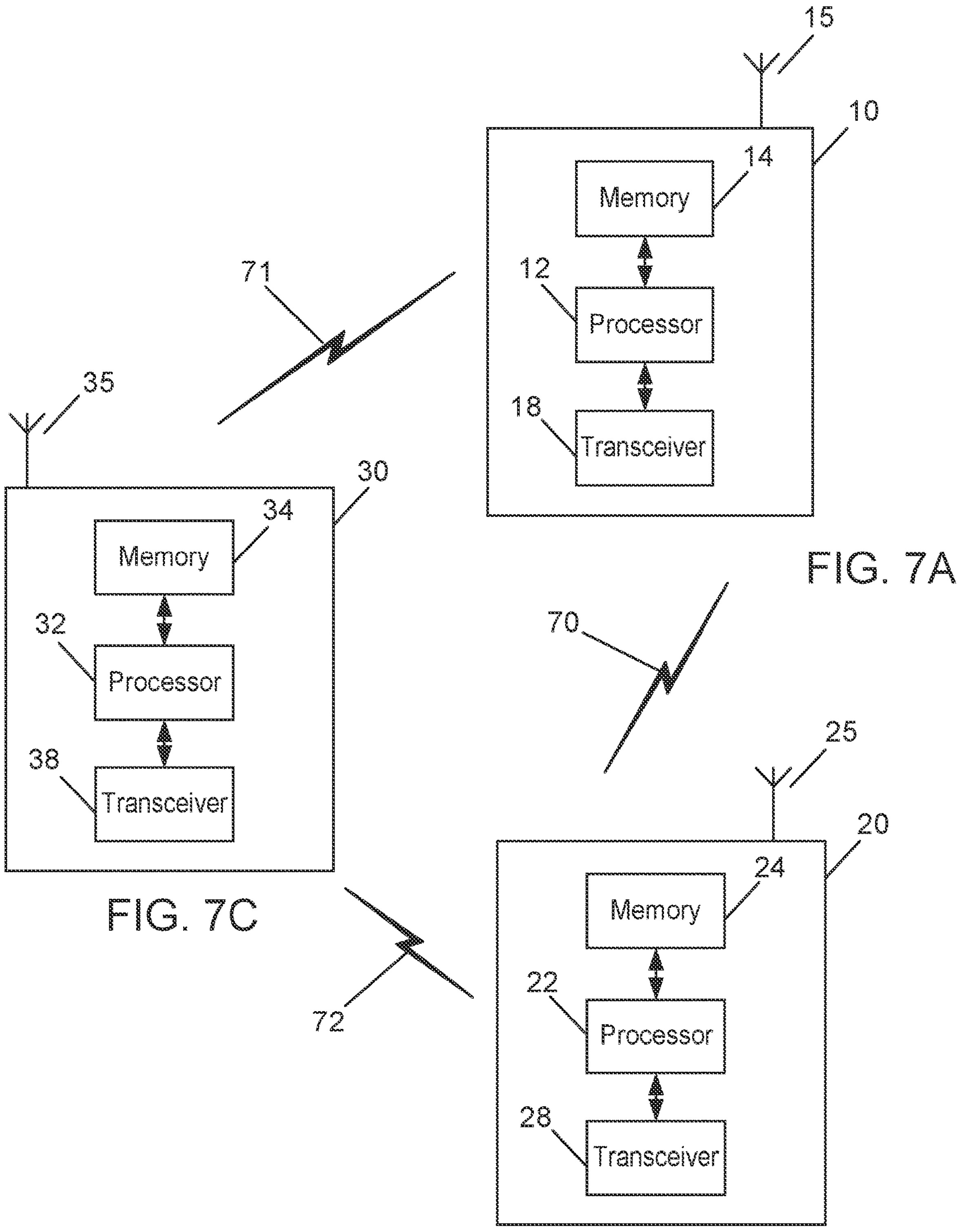
FIG. 7A illustrates an example block diagram of an apparatus, according to one example embodiment.
FIG. 7B illustrates an example block diagram of an apparatus, according to one example embodiment.
FIG. 7C illustrates an example block diagram of an apparatus, according to one example embodiment.

FIG. 7A illustrates an example of an apparatus 10 according to an example embodiment. In an example embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), and/or WLAN access point, associated with a radio access network, such as a LTE network, 5G or NR. In example embodiments, apparatus 10 may be NG-RAN node, an eNB in LTE, transmission/reception point (TRP) or gNB in 5G. According to some example embodiments, apparatus 10 may represent a service consumer and/or NWDAF.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 7A.

As illustrated in the example of FIG. 7A, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 7A, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. In certain example embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources. In certain examples, processor 12 may be configured as a processing means or controlling means for executing any of the procedures described herein.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein. In certain example embodiments, memory 14 may be configured as a storing means for storing any information or instructions for execution as discussed elsewhere herein.

In an example embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some example embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. In certain example embodiments, transceiver 18 may be configured as a transceiving means for transmitting or receiving information as discussed elsewhere herein. Additionally or alternatively, in some example embodiments, apparatus 10 may include an input and/or output device (I/O device) or means.

In an example embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some example embodiments, processor 12 and memory 14 may be included in or may form a part of processing circuitry or control circuitry. In addition, in some example embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain example embodiments, apparatus 10 may be a network node or RAN node, such as a base station, access point, Node B, eNB, gNB, WLAN access point, or the like. According to some example embodiments, apparatus 10 may represent service consumer and/or NWDAF. For example, in some example embodiments, apparatus 10 may be configured to perform one or more of the processes depicted in any of the flow charts or signaling diagrams described herein. In some example embodiments, as discussed herein, apparatus 10 may be configured to perform a procedure relating to UE sampling and data collection, for instance.

According to certain example embodiments, apparatus 10 may be controlled by memory 14 and processor 12 to receive a request for analytics information that may include an indication of one or more objects or UEs for which the analytics information is requested. For example, the analytics information may be requested for a specific UE, group of UEs or all UEs. In an embodiment, apparatus 10 may be controlled by memory 14 and processor 12 to receive the request from a service consumer (e.g., NWDAF service consumer) invoking Nnwdaf_AnalyticsSubscription_Subscribe/Nnwdaf_AnalyticsInfo_Request service operation.

According to one example embodiment, apparatus 10 may be controlled by memory 14 and processor 12 to determine the data source or NF(s) (e.g., AMF or SMF) managing the UE(s) for which the analytics information is requested. For instance, in this embodiment, the apparatus 10 may be controlled by memory 14 and processor 12 to send a request to NRF/UDM/BSF to determine which NF(s) is/are managing the UE(s).

In an embodiment, apparatus 10 may be controlled by memory 14 and processor 12 to send a subscription request, to a DCCF or the NF(s) managing the UE(s), where the subscription request may include event reporting information including a partition criteria parameter. In an embodiment, a value of the partition criteria parameter may be set to service or network information related to the UE(s) or to UE mobility information depending on the analytics information requested by the service consumer. In one example embodiment, the partition criteria parameter may include a Type Allocation Code (TAC), application identifier (ID), and/or UE communication. According to an embodiment, the subscription request may further specify a sampling ratio along with the partition criteria parameter. In some embodiments, the partition criteria parameter may be set to one or more indicators to a group of UEs. According to one embodiment, apparatus 10 may be controlled by memory 14 and processor 12 to receive a notification, from a messaging framework or the NF(s), for the indicated object(s) or UE(s). The notification may include an event notification regarding the indicated object(s) or UE(s).

FIG. 7B illustrates an example of an apparatus 20 according to another example embodiment. In an example embodiment, apparatus 20 may be a satellite, base station, a Node B, an evolved Node B (eNB), 5G Node B or access point, next generation Node B (NG-NB or gNB), and/or WLAN access point, associated with a radio access network, such as a LTE network, 5G or NR. In example embodiments, apparatus 20 may be NG-RAN node, an eNB in LTE, or gNB in 5G. According to some example embodiments, apparatus 20 may represent a data collection node, such as a DCCF, NRF, UDM, BSF, for example.

In some example embodiments, apparatus 20 may include one or more processors, one or more computer-readable storage medium (for example, memory, storage, or the like), one or more radio access components (for example, a modem, a transceiver, or the like), and/or a user interface. In some example embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 7B.

As illustrated in the example of FIG. 7B, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7B, multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an example embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some example embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other example embodiments, transceiver 28 may be capable of transmitting and receiving signals or data directly. Additionally or alternatively, in some example embodiments, apparatus 20 may include an input and/or output device (I/O device). In certain example embodiments, apparatus 20 may further include a user interface, such as a graphical user interface or touchscreen.

In an example embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 or apparatus 30 via a wireless or wired communications link or interface 70 according to any radio access technology, such as NR.

According to some example embodiments, processor 22 and memory 24 may be included in or may form a part of processing circuitry/means or control circuitry/means. In addition, in some embodiments, transceiver 28 may be included in or may form a part of transceiving circuitry or transceiving means.

As discussed above, according to some example embodiments, apparatus 20 may be network node, access node, or control node, such as a PCF, for example. According to certain example embodiments, apparatus 20 may be controlled by memory 24 and processor 22 to perform the functions associated with example embodiments described herein. For example, in some example embodiments, apparatus 20 may be configured to perform one or more of the processes depicted in any of the flow charts or signaling diagrams described herein, such as those illustrated in FIG. 2 or 4. In certain example embodiments, apparatus 20 may include or represent a data collection node, such as a DCCF, NRF, UDM, BSF. In one example embodiment, apparatus 20 may represent the DCCF illustrated in the example of FIG. 2 or the NRF/UDM/BSF illustrated in the example of FIG. 3. According to an example embodiment, apparatus 20 may be configured to perform a procedure relating to UE sampling and data collection, for instance.

In certain example embodiments, apparatus 20 may be controlled by memory 24 and processor 22 to receive a subscription request, from a network node (e.g., NWDAF), that may include event reporting information including a partition criteria parameter. In an embodiment, a value of the partition criteria parameter may be set to service or network information related to one or more UE(s) or to UE mobility information depending on the analytics information requested by the service consumer. In one example embodiment, the partition criteria parameter may include a Type Allocation Code (TAC), application identifier (ID), and/or UE communication. According to an embodiment, the subscription request may further specify a sampling ratio along with the partition criteria parameter. In some embodiments, the partition criteria parameter may be set to one or more indicators to a group of UEs.

According to certain embodiments, apparatus 20 may be controlled by memory 24 and processor 22 to determine a data source or NF(s) managing the UE(s) associated with the received subscription request. In an embodiment where apparatus 20 comprises a DCCF, apparatus 20 may be controlled by memory 24 and processor 22 to control the message bus and the adapters so the notifications traverse a messaging framework. In one embodiment, 3CA may be provided with the NWDAF's notification endpoint. According to an embodiment, apparatus 20 may be controlled by memory 24 and processor 22 to send a data request, to the data source or NF(s) (e.g., AMF or SMF), including the partition criteria parameter to inform the data source or NF(s) how to group the UEs. In an embodiment, apparatus 20 may be controlled by memory 24 and processor 22 to receive an acknowledgement of the data request from the data source or NF(s).

FIG. 7C illustrates an example of an apparatus 30 according to another example embodiment. In an example embodiment, apparatus 30 may be a node, host, or server in a communications network or serving such a network. For example, apparatus 30 may be a satellite, base station, a Node B, an evolved Node B (eNB), 5G Node B or access point, next generation Node B (NG-NB or gNB), access node, control node, and/or WLAN access point, associated with a radio access network, such as a LTE network, 5G or NR. In example embodiments, apparatus 30 may be NG-RAN node, an eNB in LTE, transmission/reception point (TRP) or gNB in 5G. According to some example embodiments, apparatus 30 may represent a data source, NF, AMF, SMF, for instance.

In some example embodiments, apparatus 30 may include one or more processors, one or more computer-readable storage medium (for example, memory, storage, or the like), one or more radio access components (for example, a modem, a transceiver, or the like), and/or a user interface. In some example embodiments, apparatus 30 may be configured to operate using one or more radio access technologies, such as GSM, LTE, LTE-A, NR, 5G, WLAN, WiFi, NB-IoT, MulteFire, and/or any other radio access technologies. It should be noted that one of ordinary skill in the art would understand that apparatus 30 may include components or features not shown in FIG. 7C.

As illustrated in the example of FIG. 7C, apparatus 30 may include or be coupled to a processor 32 for processing information and executing instructions or operations. Processor 32 may be any type of general or specific purpose processor. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 32 is shown in FIG. 7C, multiple processors may be utilized according to other example embodiments. For example, it should be understood that, in certain example embodiments, apparatus 30 may include two or more processors that may form a multiprocessor system (e.g., in this case processor 32 may represent a multiprocessor) that may support multiprocessing. In certain example embodiments, the multiprocessor system may be tightly coupled or loosely coupled (e.g., to form a computer cluster).

Processor 32 may perform functions associated with the operation of apparatus 30 including, as some examples, precoding of antenna gain/phase parameters, encoding and decoding of individual bits forming a communication message, formatting of information, and overall control of the apparatus 30, including processes related to management of communication resources.

Apparatus 30 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 34 can be comprised of any combination of random access memory (RAM), read only memory (ROM), static storage such as a magnetic or optical disk, hard disk drive (HDD), or any other type of non-transitory machine or computer readable media. The instructions stored in memory 34 may include program instructions or computer program code that, when executed by processor 32, enable the apparatus 30 to perform tasks as described herein.

In an example embodiment, apparatus 30 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 32 and/or apparatus 30.

In some example embodiments, apparatus 30 may also include or be coupled to one or more antennas 35 for receiving a downlink signal and for transmitting via an uplink from apparatus 30. Apparatus 30 may further include a transceiver 38 configured to transmit and receive information. The transceiver 38 may also include a radio interface (e.g., a modem) coupled to the antenna 35. The radio interface may correspond to a plurality of radio access technologies including one or more of GSM, LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 38 may be configured to modulate information on to a carrier waveform for transmission by the antenna(s) 35 and demodulate information received via the antenna(s) 35 for further processing by other elements of apparatus 30. In other example embodiments, transceiver 38 may be capable of transmitting and receiving signals or data directly. Additionally or alternatively, in some example embodiments, apparatus 30 may include an input and/or output device (I/O device). In certain example embodiments, apparatus 30 may further include a user interface, such as a graphical user interface or touchscreen.

In an example embodiment, memory 34 stores software modules that provide functionality when executed by processor 32. The modules may include, for example, an operating system that provides operating system functionality for apparatus 30. The memory may also store one or more functional modules, such as an application or program, to provide additional functionality for apparatus 30. The components of apparatus 30 may be implemented in hardware, or as any suitable combination of hardware and software. According to an example embodiment, apparatus 30 may optionally be configured to communicate with apparatus 10 via a wireless or wired communications link 71 and/or to communicate with apparatus 20 via a wireless or wired communications link 72, according to any radio access technology, such as NR.

According to some example embodiments, processor 32 and memory 34 may be included in or may form a part of processing circuitry or control circuitry. In addition, in some example embodiments, transceiver 38 may be included in or may form a part of transceiving circuitry.

As discussed above, according to some example embodiments, apparatus 30 may be a network node, such as a data source, NF, AMF, SMF, for instance. According to certain example embodiments, apparatus 30 may be controlled by memory 34 and processor 32 to perform the functions associated with example embodiments described herein. For instance, in some example embodiments, apparatus 30 may be configured to perform one or more of the processes depicted in any of the diagrams or signaling flow diagrams described herein. As an example, apparatus 30 may correspond to or represent a data source illustrated in the example of FIG. 2 or NF illustrated in the example of FIG. 3. According to certain example embodiments, apparatus 30 may be configured to perform a procedure relating to UE sampling and data collection, for instance.

According to an example embodiment, apparatus 30 may be controlled by memory 34 and processor 32 to receive a data request including a partition criteria parameter indicating how to group UE(s) managed by the apparatus 30. According to certain embodiments, apparatus 30 may be controlled by memory 34 and processor 32 to receive a sampling ratio along with the partition criteria parameter. In an embodiment, apparatus 30 may be controlled by memory 34 and processor 32 to provide an acknowledgement to the data request.

According to an embodiment, apparatus 30 may be controlled by memory 34 and processor 32 to group the targeted UEs to create sub-populations of UE(s) based on the partition criteria. In one embodiment, apparatus 30 may be controlled by memory 34 and processor 32 to select, from each sub-population of UE(s), a subset of UEs by sampling randomly from each sub-population according to the sampling ratio. As such, each sub-population has the same sampling ratio regardless of the size of the sub-population, and the number of UEs selected from each sub-population is proportional to the size of the sub-population. In an embodiment, apparatus 30 may be controlled by memory 34 and processor 32 to transmit, upon an event trigger, event notification(s) regarding the selected UEs to a messaging framework or NWDAF.

Furthermore, it should be noted that an apparatus, according to certain example embodiments, may include means or functions for performing any of the procedures described herein.

Therefore, certain example embodiments provide several technological improvements, enhancements, and/or advantages over existing technological processes and constitute an improvement at least to the technological field of wireless network control and management. For example, as discussed in detail in the foregoing, certain example embodiments provide methods for avoiding a non-representative sampling of UE subsets when NWDAF requests to apply a sampling ratio. Accordingly, example embodiments can avoid data collection from non-representative subset of all UEs, and thereby provide accurate network performance analytics or observed service experience. In addition, certain embodiments can reduce the amount of signaling and data collection load, e.g., by use of a sampling ratio. Thus, the use of certain example embodiments results in improved functioning of communications networks and their nodes, such as base stations, eNBs, gNBs, and/or IoT devices, UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Further examples are described below.

Example 1: A method is provided comprising: receiving a data request comprising a sampling ratio and a partition criteria parameter indicating how to group at least one user equipment; grouping the at least one user equipment to create sub-populations of user equipment based on the partition criteria; selecting, from each of the sub-populations of user equipment, a subset of user equipment by sampling randomly from each of the sub-populations according to the sampling ratio; and when an event trigger occurs, transmitting one or more event notifications regarding the at least one user equipment selected to a messaging framework or network function.

Example 2: In the method according to Example 1, the receiving comprises receiving the data request at a network node, and wherein the at least one user equipment are managed by the network node.

Example 3: In the method according to Examples 1 or 2, the receiving comprises receiving the request from a service consumer by invoking Nnf_EventExposure_Subscribe service operation.

Example 4: A method is provided comprising: receiving a request for analytics information from a service consumer, the request comprising an indication of at least one user equipment for which the analytics information is requested; transmitting a subscription request, to a data collection node or one or more network functions managing the at least one user equipment, wherein the subscription request comprises event reporting information comprising a sampling ratio and a partition criteria parameter; and receiving an event notification, from a messaging framework or the network functions, regarding the analytics information for the at least one user equipment.

Example 5: The method according to Example 4, wherein a value of the partition criteria parameter is set to service or network information related to the at least one user equipment or to user equipment mobility information depending on the analytics information requested by the service consumer.

Example 6: The method according to Example 4 or 5, wherein the partition criteria parameter comprises at least one of a Type Allocation Code (TAC), application identifier (ID), and/or UE communication.

Example 7: The method according to any of the Examples 4-6, wherein the analytics information is requested for a specific user equipment, for a group of user equipment, or for all user equipment.

Example 8: The method according to any of the Examples 4-7, wherein the receiving comprises receiving the request from a service consumer invoking Nnwdaf_AnalyticsSubscription_Subscribe or Nnwdaf_AnalyticsInfo_Request service operation.

Example 9: The method according to any of the Examples 4-8, further comprising determining the data source or network functions managing the at least one user equipment for which the analytics information is requested.

Example 10: An apparatus, comprises at least one processor; and at least one memory comprising computer program code. The at least one memory and computer program code are configured, with the at least one processor, to cause the apparatus at least to perform a method according to any of the Examples 1-9.

Example 11: An apparatus, comprises means for performing the method according to any of the Examples 1-9.

Example 12: An apparatus, comprises circuitry configured to perform the method according to any of the Examples 1-9.

Example 13: A computer readable medium comprising program instructions stored thereon for performing at least the method according to any of the Examples 1-9.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. A method, comprising:

receiving a data request comprising a partition criteria parameter and a sampling ratio, wherein the partition criteria parameter indicates how to group a plurality of user equipment into a plurality of sub-populations, each respective sub-population of the plurality of sub-populations including one or more user equipment of the plurality of user equipment, and wherein the sampling ratio is to be used to select a subset comprising at least one user equipment from each respective sub-population by sampling randomly from each respective sub-population of the sub-populations according to the sampling ratio;

grouping the plurality of user equipment based on the partition criteria to create the plurality of sub-populations;

selecting the subset comprising the at least one user equipment from each respective sub-population, wherein the selecting the subset comprises:

sampling randomly, for the subset, from each respective sub-population of the sub-populations, the at least one user equipment of the respective sub-population according to the sampling ratio; and transmitting, to a messaging framework or network function, based on an occurrence of an event trigger, one or more event notifications regarding the subset comprising the at least one user equipment from each respective sub-population.

2. The method according to claim 1, wherein the receiving comprises receiving the data request at a network node, and wherein the plurality of user equipment is managed by the network node.

3. The method according to claim 1, wherein the receiving comprises receiving the data request from a service consumer, wherein the receiving the data request is comprised in a Nnf_EventExposure_Subscribe service operation.

4. A method, comprising:

receiving a request for analytics information from a service consumer, the request comprising an indication of a plurality of user equipment for which the analytics information is requested;

transmitting a subscription request, to one or more data collection nodes for the plurality of user equipment or one or more network functions for managing the plurality of user equipment, wherein the subscription request comprises event reporting information comprising a partition criteria parameter and a sampling ratio, wherein the partition criteria parameter indicates how to group the plurality of user equipment into sub-populations, each respective subpopulation of the plurality of subpopulations including one or more user equipment of the plurality of user equipment, and wherein the sampling ratio is to be used to select a subset comprising at least one user equipment from each respective sub-population by sampling randomly from each sub-population of the sub- populations according to the sampling ratio; and receiving an event notification, from a messaging framework or the network functions, regarding the analytics information for the subset of user equipment comprising the at least one user equipment selected from each respective sub-population of the sub-populations by sampling randomly from each respective sub-population of the sub-populations according to the sampling ratio.

5. The method according to claim 4, wherein a value of the partition criteria parameter is set to service or network information related to the plurality of user equipment or to user equipment mobility information that depends on the analytics information of the request received from the service consumer.

6. The method according to claim 4, wherein the partition criteria parameter comprises at least one of a Type Allocation Code (TAC), application identifier (ID), or UE communication and mobility information.

7. The method according to claim 4, wherein the analytics information is requested for a group of user equipment or for all user equipment, wherein the plurality of equipment comprises the group of user equipment or the all user equipment.

8. The method according to claim 4, wherein the receiving comprises receiving the request from the service consumer, wherein the receiving the request is comprised in a Nnwdaf_AnalyticsSubscription_Subscribe service operation or Nnwdaf_AnalyticsInfo_Request service operation.

9. The method according to claim 4, further comprising determining the one or more network functions for managing the plurality of user equipment for which the analytics information is requested.

10. An apparatus, comprising:

at least one processor; and at least one memory comprising computer program code, which, when executed by the at least one processor, cause the apparatus at least to perform:

receiving a data request comprising a partition criteria parameter and a sampling ratio, wherein the partition criteria parameter indicates how to group a plurality of user equipment into a plurality of sub-populations, each respective sub-population of the plurality of sub-populations including one or more user equipment of the plurality of user equipment, and wherein the sampling ratio is to be used to select a subset comprising at least one user equipment from each respective sub-population by sampling randomly from each respective sub-population of the sub-populations according to the sampling ratio;

grouping the plurality of user equipment based on the partition criteria to create the plurality of sub-populations;

selecting the subset comprising the at least one user equipment from each respective sub-population, wherein the selecting the subset comprises:

sampling randomly, for the subset, from each respective sub-population of the sub-populations, the at least one user equipment of the respective sub-population according to the sampling ratio; and transmitting, to a messaging framework or network function, based on an occurrence of an event trigger, one or more event notifications regarding the subset comprising the at least one user equipment from each respective sub-population.

11. The apparatus according to claim 10, wherein the receiving comprises receiving the data request at a network node, and wherein the plurality of user equipment is managed by the network node.

12. The apparatus according to claim 10, the receiving comprises receiving the data request from a service consumer, wherein the receiving the data request is comprised in a Nnf_EventExposure_Subscribe service operation.

13. An apparatus, comprising:

at least one processor; and at least one memory comprising computer program code, which, when executed by the at least one processor, cause the apparatus at least to perform:

receiving a request for analytics information from a service consumer, the request comprising an indication of a plurality of user equipment for which the analytics information is requested;

transmitting a subscription request, to one or more data collection nodes for the plurality of user equipment or one or more network functions for managing the plurality of user equipment, wherein the subscription request comprises event reporting information comprising a partition criteria parameter and a sampling ratio, wherein the partition criteria parameter indicates how to group the plurality of user equipment into sub-populations, each respective subpopulation of the plurality of subpopulations including one or more user equipment of the plurality of user equipment, and wherein the sampling ratio is to be used to select a subset comprising at least one user equipment from each respective sub-population by sampling randomly from each sub-population of the sub-populations according to the sampling ratio; and receiving an event notification, from a messaging framework or the network functions, regarding the analytics information for the subset of user equipment comprising the at least one user equipment selected from each respective sub-population of the sub-populations by sampling randomly from each respective sub-population of the sub-populations according to the sampling ratio.

14. The apparatus according to claim 13, wherein a value of the partition criteria parameter is set to service or network information related to the plurality of user equipment or to user equipment mobility information that depends on the analytics information of the request received from the service consumer.

15. The apparatus according to claim 13, wherein the partition criteria parameter comprises at least one of a Type Allocation Code (TAC), application identifier (ID), or UE communication and mobility information.

16. The apparatus according to claim 13, wherein the analytics information is requested for a group of user equipment or for all user equipment, wherein the plurality of equipment comprises the group of user equipment or the all user equipment.

17. The apparatus according to claim 13, wherein the receiving comprises receiving the request from the service consumer, wherein the receiving the request is comprised in a Nnwdaf_AnalyticsSubscription_Subscribe service operation or Nnwdaf_AnalyticsInfo_Request service operation.

18. The apparatus according to claim 13, further comprising determining the one or more network functions for managing the plurality of user equipment for which the analytics information is requested.

19. A non-transitory computer readable medium comprising storing program instructions, which, when executed by an apparatus, cause the apparatus to perform operations, the operations comprising:

receiving a data request comprising a partition criteria parameter and a sampling ratio, wherein the partition criteria parameter indicates how to group a plurality of user equipment into a plurality of sub-populations, each respective sub-population of the plurality of sub-populations including one or more user equipment of the plurality of user equipment, and wherein the sampling ratio is to be used to select a subset comprising at least one user equipment from each respective sub-population by sampling randomly from each respective sub-population of the sub-populations according to the sampling ratio;

grouping the plurality of user equipment based on the partition criteria to create the plurality of sub-populations;

selecting the subset comprising the at least one user equipment from each respective sub-population, wherein the selecting the subset comprises:

sampling randomly, for the subset, from each respective sub-population of the sub-populations, the at least one user equipment of the respective sub-population according to the sampling ratio; and transmitting, to a messaging framework or network function, based on an occurrence of an event trigger, one or more event notifications regarding the subset comprising the at least one user equipment from each respective sub-population.

* * * * *